United States Patent
Pai

[11] Patent Number: 5,230,155
[45] Date of Patent: Jul. 27, 1993

[54] CUTTING TOOL INTENDED FOR USE TO STRIP THE SKIN FROM A VEGETABLE OR FRUIT

[76] Inventor: Chung-Jen Pai, No. 309, Lien Cheng Road, Chung Ho City, Taipei Hsien, Taiwan

[21] Appl. No.: 965,237

[22] Filed: Oct. 23, 1992

[30] Foreign Application Priority Data

Jun. 22, 1992 [CN] China .............. 92 2 25721.3

[51] Int. Cl.⁵ .............................................. B26B 7/00
[52] U.S. Cl. ................................. 30/277.4; 30/123.7; 30/162; 30/DIG. 1
[58] Field of Search ............. 30/277.4, 272.1, 162, 30/123, DIG. 1, 123.7, 286, 287

[56] References Cited

U.S. PATENT DOCUMENTS 3,359,637 12/1967 Hansen .................... 30/DIG. 1
4,592,140 6/1986 Chasen ........................ 30/162
4,891,884 1/1990 Torbet ....................... 30/277.4

FOREIGN PATENT DOCUMENTS 1470337 1/1967 France ...................... 30/277.4

Primary Examiner—Frank T. Yost
Assistant Examiner—Hwei-Siu Payer
Attorney, Agent, or Firm—Bucknam and Archer

[57] ABSTRACT

A cutting tool for cutting vegetables or fruits and stripping the skin therefrom. The cutting tool includes a blade cutter reciprocated by a motor through a steering shaft for stripping the skin from a vegetable or fruit, a power supply unit electrically connected to the motor through an On/Off switch, and a spring-supported cutting-in tool controlled by a press button to extend out of the casing of the cutting tool for cutting fruits and vegetables.

3 Claims, 3 Drawing Sheets

CUTTING TOOL INTENDED FOR USE TO STRIP THE SKIN FROM A VEGETABLE OR FRUIT

BACKGROUND OF THE INVENTION

The present invention relates to cutting tools and relates more particularly to such a cutting tool intended for use to strip the skin from a vegetable or fruit.

The skin of any of a variety of vegetables or fruits should be peeled off before eating or cooking. However, it is not so easy to strip the skin from a vegetable or fruit. Furthermore, the fingers may be injured easily while using a cutting tool to strip the skin from a vegetable or fruit.

SUMMARY OF THE INVENTION

The present invention has been accomplished under the aforesaid circumstances. It is therefore an object of the present invention to provide a cutting tool which is practical in use for stripping the skin from a vegetable or fruit as well as cutting off part of a vegetable or fruit. It is another object of the present invention to provide a cutting tool which is safe in use. According to the preferred embodiment, a cutting tool is generally comprised of a casing to hold a transmission mechanism, a blade cutter assembly, a cutting tool assembly, and a power supply unit. The power supply unit is comprised of a rechargeable battery set connected to the transmission mechanism through an On/Off switch. The blade cutter assembly is comprised of a blade cutter fastened to a tool holder reciprocated by a tool carrier by means of the operation of a steering shaft and a motor. The cutting tool assembly is comprised of a spring-supported cutting tool controlled by a press button to extend out of the casing for cutting fruits and vegetables.

DETAILED DESCRIPTION OF THE PREFERRED EMBODIMENT

Figure 1:
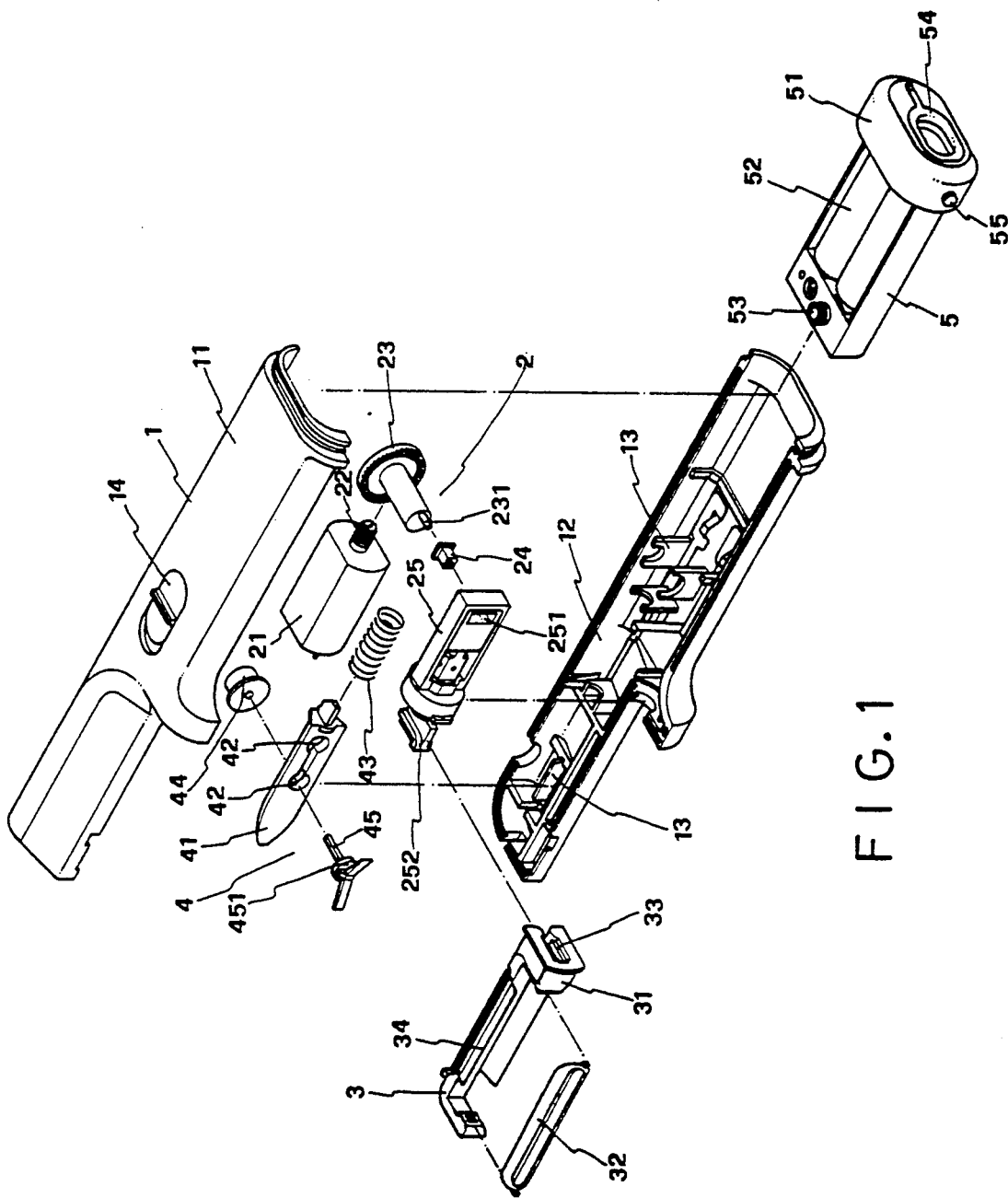
FIG. 1 is a perspective exploded view of a cutting tool embodying the present invention.
Figure 2:
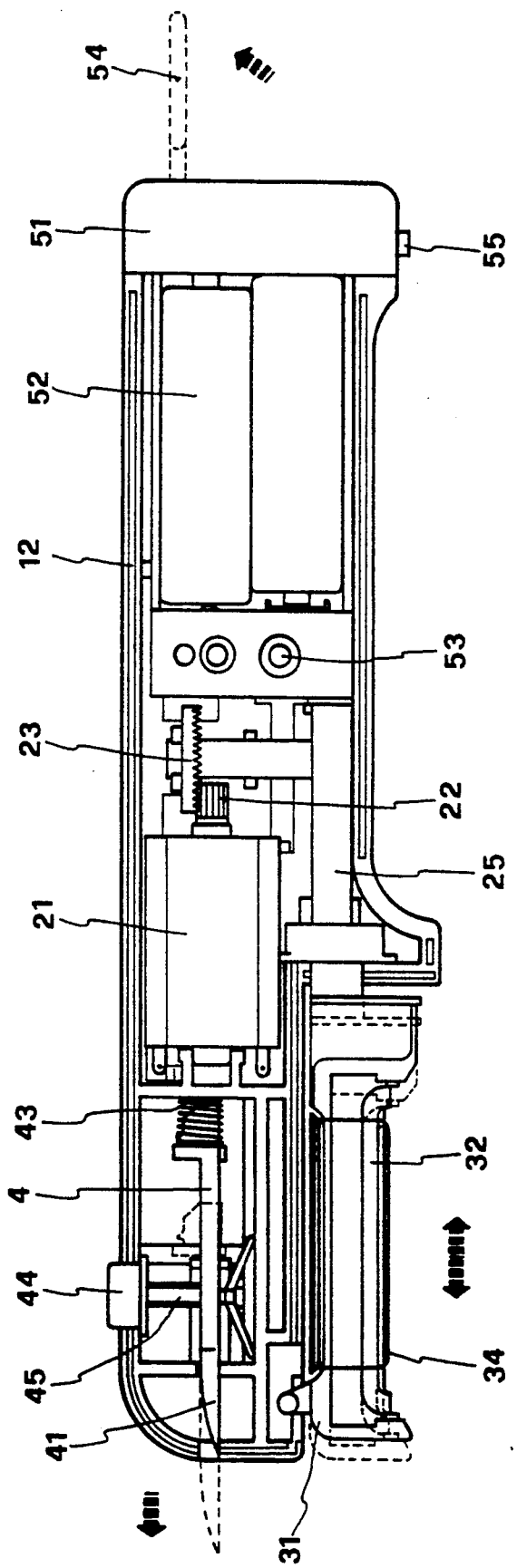
FIG. 2 is a cross section thereof in longitudinal direction.
Figure 3:
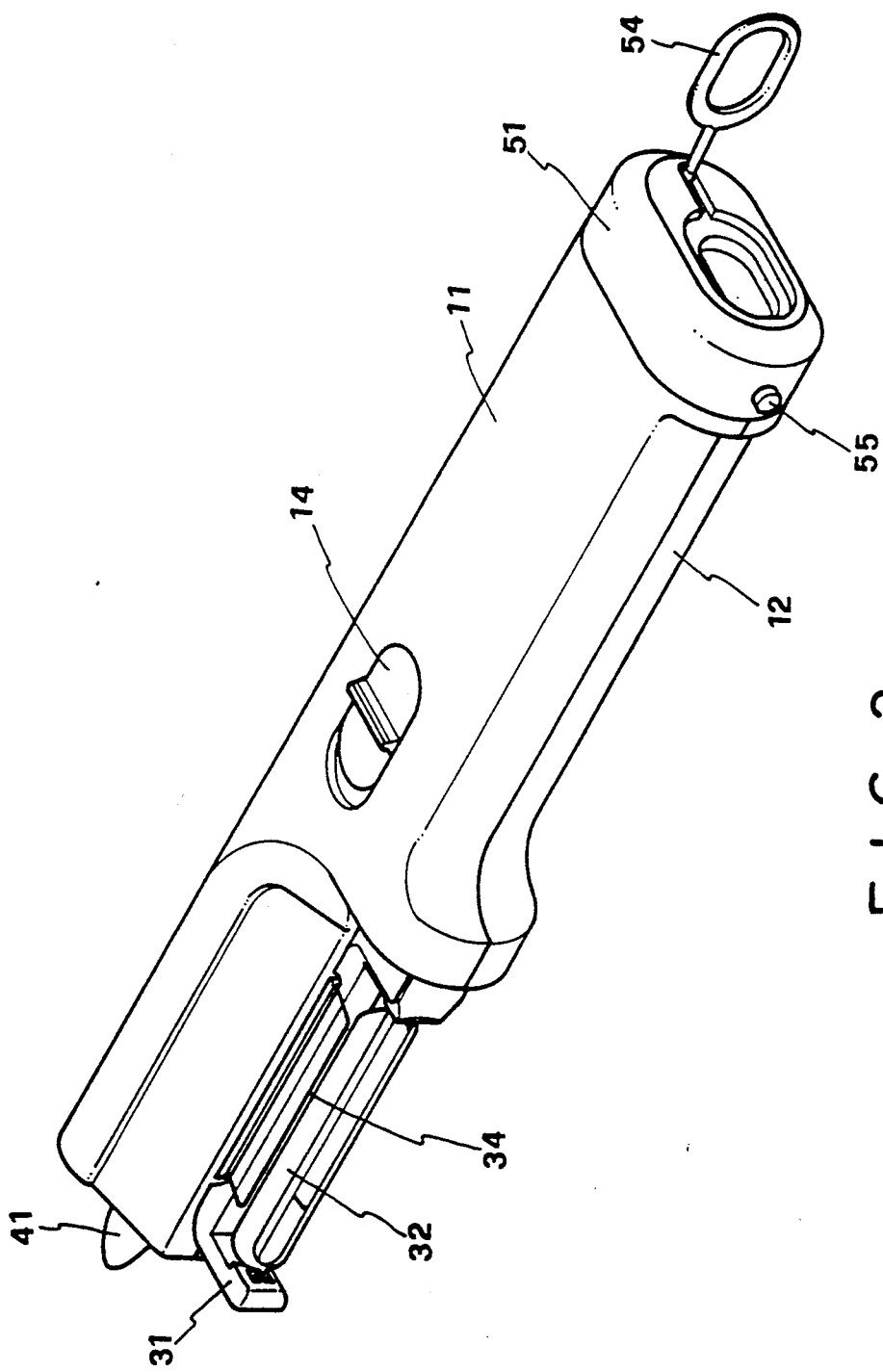
FIG. 3 is an elevational view thereof.

Referring to FIGS. 1, 2 and 3, therein illustrated is a cutting tool embodying the present invention which is generally comprised of a casing 1, a transmission mechanism 2, a blade cutter assembly 3, a cutting-in tool assembly 4, and a power supply unit 5.

The casing 1 is made in a flat, hollow, elongated shape consisted of an upper shell 11 and a bottom shell 12, having a plurality of supports 13 for holding the transmission mechanism 2, the blade cutter assembly 3, the cutting-in tool assembly 4 and the power supply unit 5. An On/Off switch 14 is mounted on the top shell 11 of the casing 1 and controlled to electrically connect the power supply unit 5 to the transmission mechanism 2.

The transmission mechanism 2 comprises a motor 21 having a toothed output shaft 22 meshed with a toothed steering shaft 23 at one end. The toothed steering shaft 23 has an eccentric rod 231 on the opposite end inserted into a hole (not shown) on a connector 24, which is fastened in a square hole 251 on one end of a tool carrier 25. The tool carrier 25 has the opposite end formed into a front hook 252, on which the blade cutter assembly 3 is mounted. Therefore, turning on the motor 21 causes the eccentric rod 231 of the steering shaft 23 to reciprocate the tool carrier The blade cutter assembly 3 comprises a cutting blade 32 fastened to a tool holder 31 and bilaterally protected by wire meshes 34. The tool holder 31 has a retaining U-shaped member 33 on one end thereof, on which the front hook 252 of the tool carrier 25 hooks. As the motor 21 was turned on, the tool carrier 25 is reciprocated by the eccentric rod 231 of the steering shaft 23 to alternatively move the blade cutter assembly 3 back and forth.

The cutting tool assembly 4 comprises a cutting tool 41 supported on a compression spring 43 and alternatively locked in either operative position (extended out of the casing 1 for cutting) or non-operative position (received inside the casing 1) by means of the control of a press button 44 and a spring retainer 45. The cutting tool 41 has two spaced locating holes 42 communicated with each other. The spring retainer 45 has a spring ring 451 inserted in one locating hole 42 on the cutting-in tool 41 at the front. Pressing the press button 44 causes the spring ring 451 to be moved from the locating hole at the front for permitting the cutting-in tool 41 to be suddenly moved out of the casing 1 (see FIG. 2). As the cutting-in tool 41 was extended out of the casing 1, the press button 44 is released for permitting the spring ring 451 of the spring retainer 45 to move into the locating hole at the back in locking the cutting-in tool 41 in operative position. On the contrary, the cutting-in tool 41 can be conveniently received back into non-operative position by keeping the press button pressed and then squeezing the cutting-in tool 41 against a supporting surface for permitting the spring ring 451 of the spring retainer 45 to be moved from the locating hole at the front to the locating hole at the back.

The power supply unit 5 is comprised of a battery case 51 to hold a battery set 52. The battery set 52 is preferably of a kind of storage battery which is rechargeable. The battery case 51 has a charge charging terminal 53 adjacent to one end thereof, a folding loop 54 on the opposite end thereof for hanging, and a spring key 55 at a suitable location controlled to fasten the battery case 51 to the casing 1.

When assembled, as shown in FIG. 3, the cutting blade 32 of the blade cutter assembly 3 may be controlled to move back and forth in stripping of the skin from a vegetable or fruit, or the cutting tool 41 of the cutting tool assembly 4 may be extended out of the casing 1 for cutting the skin of a vegetable or fruit and removing the rotten or undesired part thereof. As the battery set 52 of the power supply unit 5 is rechargeable, the present invention produces little environmental pollution problem.

The aforesaid preferred embodiment of the present invention is simple in structure and therefore functional. It shall be understood that various modifications and changes could be made without departing from the scope of the present invention and the present invention is not to be considered limited to what is shown in the drawings and described in the specification.

What is claimed is:

1. A cutting tool which comprises a casing consisting of an upper shell and a bottom shell, said casing having a plurality of supports in the interior thereof, a transmission mechanism, a blade cutter assembly, a cutting tool assembly and a power supply unit, said supports supporting said transmission mechanism, said blade cutter assembly, said cutting tool assembly, said power supply unit, said upper shell having an On/Off switch;

said transmission mechanism consisting of a motor having a toothed output shaft, a steering shaft having a toothed portion at one end meshed with said toothed output shaft at right angle and an eccentric rod at the opposite end of said steering shaft, and a first tool holder having a square hole at the rear end thereof and a hook portion in the front end thereof, said eccentric rod reciprocating said tool holder when the motor is on;

said blade cutter assembly having a cutting blade, bilaterally protected by wire meshes, a second tool holder, said cutting blade being fastened to said second tool holder, said second tool holder having a U-shaped member at one end thereof, said hook on said first tool holder engaging with said U-shaped member;

said cutting tool assembly having a cutting tool, a compression spring, a press button and a spring retainer, said compression spring supporting said cutting tool, said cutting tool having two spaced holes communicating with each other, said spring retainer going through one of said holes and having a spring ring, and being adapted to retain said compression spring, said press button when it is pressed causing said spring ring to move out of said hole whereby said cutting tool is moved out of said casing, said cutting tool being alternatively locked in a front operative position or a rear inoperative position by control of said press button and said spring retainer, said cutting tool being extended out of said casing when it is locked in said front operative position or received inside said casing when it is locked in said rear inoperative position; and said power supply unit having a battery set held in a battery case fastened to said casing at the rear end thereof, on said battery case, a spring key locking in place said battery set, said power supply unit being connected to said motor and being controlled by said On/Off switch.

2. The cutting tool of claim 1 wherein said battery case of said power supply unit is coupled with a folding loop for hanging.

3. The cutting tool of claim 1 wherein said battery set is a rechargeable battery; said battery case has a charge charging terminal for charging said battery set.

* * * * *